United States Patent [19]

Hodgson

[11] 3,925,428

[45] Dec. 9, 1975

[54] HYDROXY-ALUMINUM NITRATE POLYMER PRODUCTION

[75] Inventor: Clive Hodgson, Forest Knolls, Calif.

[73] Assignee: Chevron Research Company, San Francisco, Calif.

[22] Filed: Apr. 8, 1974

[21] Appl. No.: 458,631

[52] U.S. Cl. .............................. 423/394; 423/395
[51] Int. Cl.² ........................................ C01B 21/40
[58] Field of Search .......... 423/394, 395, 396, 397, 423/111, 125, 127; 149/46, 57

[56] References Cited
UNITED STATES PATENTS

| | | | |
|---|---|---|---|
| 3,457,127 | 7/1969 | Cook | 149/46 |
| 3,783,053 | 1/1974 | Oettmeier et al. | 149/46 |
| 3,816,590 | 6/1974 | Huska et al. | 423/125 |

OTHER PUBLICATIONS

Pauling, L.; Nature of the Chemical Bond; New York, 1960, pp. 344–350 and 558–559.

*Primary Examiner*—Walter R. Satterfield
*Attorney, Agent, or Firm*—J. A. Buchanan, Jr.; John Stoner, Jr.; Raymond Owyang

[57] ABSTRACT

Hydroxy-aluminum nitrate polymer and ammonium nitrate are produced by reacting aluminum nitrate and urea in aqueous solution. The hydroxy-aluminum nitrate polymer is useful for consolidating soil in secondary oil recovery and for reducing the caking tendency of ammonium salt fertilizer compositions.

6 Claims, No Drawings

HYDROXY-ALUMINUM NITRATE POLYMER PRODUCTION

BACKGROUND OF THE INVENTION

Hydroxy-aluminum polymers can be prepared by the controlled addition of an alkali metal base, e.g., sodium hydroxide, to an aqueous solution of a water-soluble aluminum salt. It is believed that when the base is added to an aluminum salt solution, $OH^-$ ions link the $Al^{3+}$ ions together forming stable rings composed of six Al atoms per unit. When the molar ratio of OH/Al is in the range of 0 to 2.1, the reaction involves the formation of single units of compositions— $[Al_6(OH)_2]^{8+}$ — or double units — $[Al_{10}(OH)_{22}]^{8+}$. With ratios from 2.25 to 2.7, the additional $OH^-$ reacts with these simple units and forms a continuous series of higher polymers.

The nature of hydroxy-aluminum polymers and their preparation are discussed by P. H. Hsu and T. F. Bates, in *Soil Science Society of America Proceedings*, 28, No. 6, 763–769 (1964), and in "Formation of X-ray Amorphous and Crystalline Aluminum Hydroxides," *Mineralogical Magazine*, 33, 749–768 (1964).

Hydroxy aluminum polymers are used for soil consolidation in secondary oil recovery, as disclosed, for example, in U.S. Pat. No. 3,603,399, issued Sept. 7, 1971, to M. G. Reed.

Hydroxy aluminum polymers are also used as additives in ammonium salt compositions to reduce caking tendency and to improve hardness, as disclosed in U.S. Ser. No. 323,571, of G. R. Hawkes et al, filed Jan. 15, 1973, now U.S. Pat. No. 3,852,055.

SUMMARY OF THE INVENTION

It has now been found that hydroxy-aluminum nitrate polymer is produced by reacting aluminum nitrate and urea in aqueous solution. Although it is not desired to be bound by any particular theory, the approximate stoichiometry of the reaction appears to be (1):

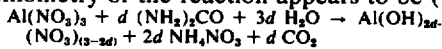

wherein $d$ can vary from 0 to 1.4. It is appreciated, of course, that when $d$ is 0, no urea reactant is present. Therefore, $d$ preferably varies from about 0.1 to 1.4, more preferably from about 0.5 to 1.3, and most preferably from about 1 to 1.3.

The process of the invention is particularly useful for preparing hydroxy-aluminum polymer additives for fertilizer compositions, since the ammonium nitrate produced in the process has fertilizer value.

DESCRIPTION OF PREFERRED EMBODIMENTS

In general, any commercially available grade of urea is suitably employed in the process of the invention. The aluminum nitrate reactant is suitably anhydrous aluminum nitrate or hydrated aluminum nitrate. Largely because of commercial availability, aluminum nitrate nonahydrate is preferred.

The molar ratio of aluminum nitrate to urea suitably varies from about 1:0.1 to 1:1.4, preferably from about 1:0.5 to 1:1.3, more preferably from about 1:1 to 1:1.3.

The process of the invention is conducted in aqueous solution. Generally, from about 1 mol to 1,000 mols of water per mol urea is employed, although from about 10 to 100 mols of water per mol urea is preferred.

A variety of procedures can be employed for contacting the reactants. In one modification, the entire amounts of reactants are charged to a reactor and maintained at reaction conditions for the desired reaction period. In another modification, one reactant is added to the other reaction components in increments, as by adding urea to an aqueous solution of aluminum nitrate. By any modification, the process is most efficiently conducted at elevated temperatures. In general, temperatures varying from about 50° to 150°C are satisfactory, with temperatures from about 75° to 125°C being preferred. The most preferred reaction temperature is the boiling point of the reaction mixture, i.e., reflux temperature. Atmospheric, subatmospheric or superatmospheric pressures are suitably employed, although it is generally most convenient to employ atmospheric reaction pressure. Reaction times, of course, depend in part upon the molar ratio of reactants and in part upon the reaction temperature and pressure. Generally, however, reaction times varying from 1 hour to 24 hours are satisfactory.

The aqueous product mixture of hydroxy-aluminum nitrate polymer and ammonium nitrate is suitable for most applications, such as in fertilizers or in soil consolidations, without further purification. However, if desired, the product mixture can be evaporated to give more concentrated solutions or solid products.

The aluminum to hydroxyl molar ratio of the hydroxy-aluminum nitrate polymer depends largely upon the molar ratio of aluminum nitrate to urea employed in the process. Generally, the preferred molar ratio of aluminum to hydroxyl is from about 1:0.9 to 1:2.6, and more preferably, from 1:2 to 1:2.6.

The preparation of hydroxy-aluminum nitrate polymer and ammonium nitrate by the process of the invention is illustrated by the following examples.

EXAMPLES

EXAMPLE 1

Aluminum nitrate nonahydrate (75 g, 0.2 mol) water (75 g, 4.2 mol) and crystal urea (6 g, 0.1 mol) were refluxed together for 16 hours. No fumes could be seen coming from the reactor during this period. The clear solution which resulted was analyzed for aluminum content and hydroxyl content and found to have a hydroxyl to aluminum ratio of 0.88:1. The hydroxyl content was determined by direct titration after the addition of potassium oxalate to prevent hydrolysis of the aluminum ion. There was no loss of nitrogen during the process and the final solution contained 42% by weight of ammonium nitrate based on the weight of the $Al(OH)_{0.88} (NO_3)_{2.12}$ found.

EXAMPLE 2

Aluminum nitrate nonahydrate (75 g, 0.2 mol) water (75 g, 4.2 mol) and crystal urea (12 g, 0.2 mol) were refluxed together for 16 hours. No fumes were evident in the reactor during this period. The clear solution which resulted was analyzed for aluminum content and hydroxyl content and found to have a hydroxyl to aluminum ratio of 1.95:1. There was no nitrogen loss during the process and the final solution contained 121% by weight of ammonium nitrate based on the weight of $Al(OH)_{1.95} (NO_3)_{1.05}$ found.

EXAMPLE 3

Aluminum nitrate nonahydrate (75 g, 0.2 mol) water (75 g, 4.2 mol) and crystal urea (15.5 g, 0.26 mol) were heated under reflux for about 16 hours. No fumes came from the reactor during this time. The clear solution which resulted was analyzed for aluminum and hydroxyl content and found to have a hydroxyl-to-aluminum ratio of 2.39:1. There was no loss of nitrogen during this process and the final solution contained 186% by weight of ammonium nitrate, based on the weight of $Al(OH)_{2.4}(NO_3)_{0.6}$ found.

EXAMPLE 4

Aluminum nitrate nonahydrate (75 g, 0.2 mol) water (75 g, 4.2 mol) and crystal urea (17 g, 0.2 mol) were heated together for several hours. Gradually, the solution began to form an opaque gel of hydroxy-aluminum nitrate.

EXAMPLE 5

Aluminum nitrate nonahydrate (75 g, 0.2 mol) was dissolved in 50 ml water and to it was added 9.0 g (0.33 mol) of aluminum powder. The mixture was then heated under reflux for about 16 hours. Red-brown fumes were emitted from the reaction vessel during this time and some foaming occurred in the vessel. The resulting clear solution was analyzed for aluminum content and hydroxyl content, revealing the hydroxyl to aluminum ratio to be 2.40:1. There was no ammonium nitrate formed and there was an overall loss of nitrogen amounting to 52% of the starting nitrogen.

What is claimed is:

1. A process of preparing hydroxy-aluminum nitrate of the empirical formula $$Al(OH)_{2d}(NO_3)_{(3-2d)}$$

wherein $d$ varies from about 0.1 to 1.4 and ammonium nitrate by reacting aluminum nitrate and urea, wherein the molar ratio of aluminum nitrate to urea varies from about 1:0.1 to 1:1.4, at a temperature of about 50 to 150°C, in aqueous solution of about 1 mol to 1,000 mols of water per mol urea.

2. The process of claim 1 wherein the molar ratio of aluminum nitrate to urea varies from about 1:0.5 to 1:1.3 and the molar ratio of aluminum to hydroxyl in the hydroxy-aluminum nitrate varies from about 1:0.9 to 1:2.6.

3. The process of claim 2 wherein the molar ratio of aluminum nitrate to urea varies from about 1:1 to 1:1.3 and the molar ratio of aluminum to hydroxyl in the hydroxy-aluminum polymer varies from about 1:2 to 1:2.6.

4. The process of claim 1 wherein the aluminum nitrate is aluminum nitrate nonahydrate.

5. The process of claim 1 wherein the temperature varies from 75° to 125°C.

6. The process of claim 1, wherein about 10 to 100 mols of water per mol of urea is employed.

* * * * *